Jan. 9, 1940.    G. H. GLEASON ET AL    2,186,453
RECOVERY OF SULPHUR DIOXIDE
Filed Jan. 17, 1938
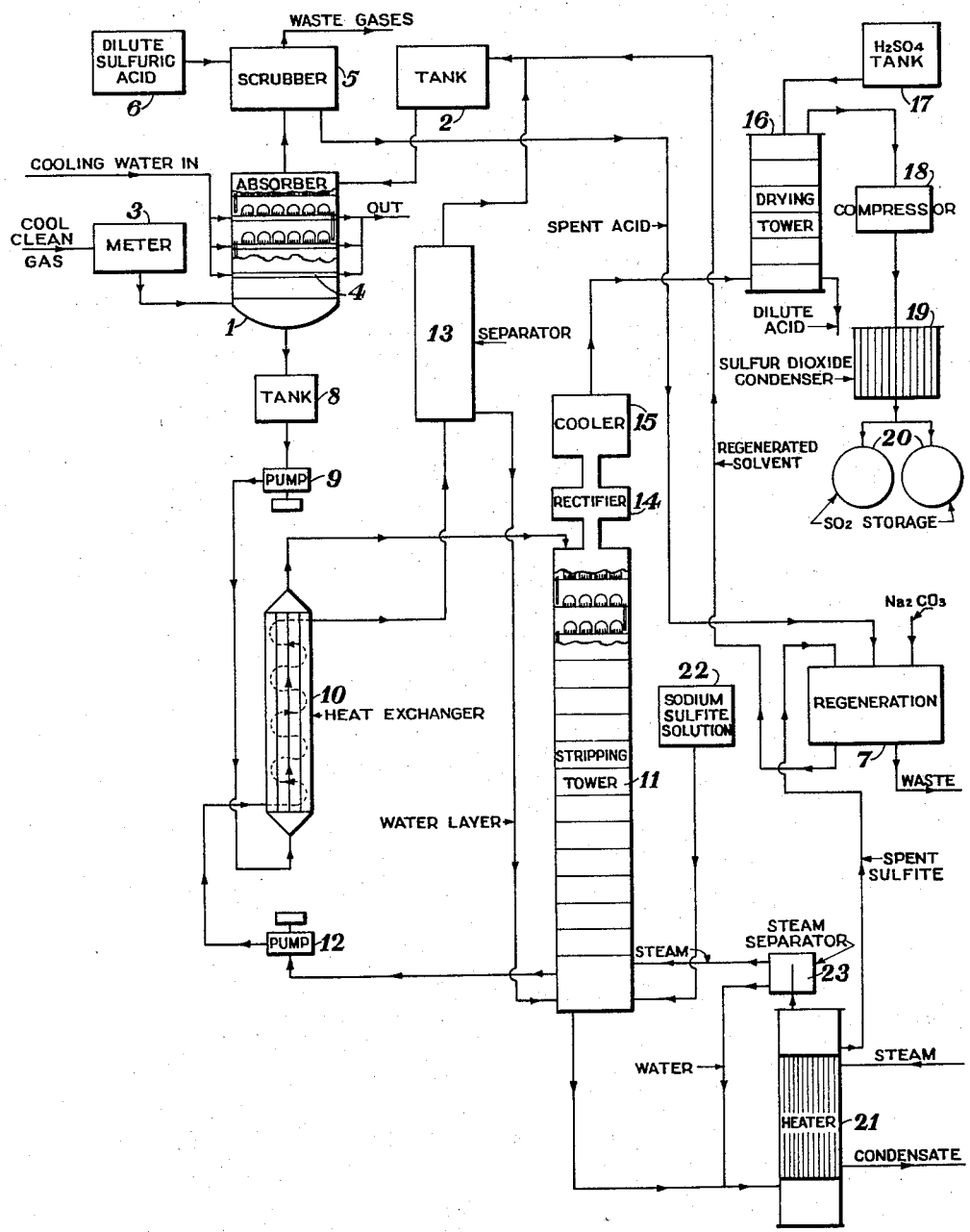
INVENTORS
George H. Gleason
Alfred C. Loonam
BY
Pennie, Davis, Marvin & Edmonds
ATTORNEYS Patented Jan. 9, 1940

2,186,453

UNITED STATES PATENT OFFICE 2,186,453

RECOVERY OF SULPHUR DIOXIDE

George H. Gleason, Montclair, N. J., and Alfred C. Loonam, Brooklyn, N. Y., assignors to Guggenheim Brothers, New York, N. Y., a co-partnership Application January 17, 1938, Serial No. 185,348

4 Claims. (Cl. 23—178)

This invention relates to the recovery of sulphur dioxide and has for an object the provision of an improved process for recovering sulphur dioxide from gases containing sulphur dioxide mixed with other gases. The process of the invention may be employed for the recovery of sulphur dioxide from gas mixtures containing sulphur dioxide in any degree of concentration, and it is particularly suitable for the treatment of gas mixtures containing relatively small concentrations of sulphur dioxide, such, for example, as gas mixtures resulting from the roasting of pyrites and other sulphide ores, concentrates, and other metallurgical raw materials and products containing metal sulphides.

The process of the invention may be employed to produce a substantially pure sulphur dioxide product, in either gaseous or liquid form, or to produce gaseous products containing sulphur dioxide in any suitable proportions. The invention provides an effective and economical method for producing sulphur dioxide-bearing products for various chemical and metallurgical uses, as, for example, in the production of sulphuric acid, in the production of sulphite cooking liquors, in the production of elemental sulphur by reduction of the sulphur dioxide, in refrigeration and in the leaching of ores. The invention further provides an effective and economical method of reducing or eliminating the injurious effects resulting from discharging roaster and other smelter gases into the atmosphere, and, at the same time, permits the recovery in useful form of an important component of such injurious gases.

The process of the invention is of the type in which gases containing sulphur dioxide are treated with a liquid absorbent, and the absorbed sulphur dioxide is expelled, with regeneration of the absorbent, by heating or by reduction of pressure with or without heating, the regenerated absorbent being used for the treatment of additional quantities of gases.

The process of the invention involves the use of dimethyl-aniline, a compound of the class known as aromatic amines, as an absorption agent for sulphur dioxide. We have found that dimethyl-aniline possesses many properties which make it a highly suitable absorption agent for sulphur dioxide. Among these properties are (1) high capacity for absorption of sulphur dioxide at ordinary temperatures, (2) ready and substantially complete release of absorbed sulphur dioxide at elevated temperatures, (3) little tendency to cause oxidation of sulphur dioxide during absorption, (4) low heat of absorption for sulphur dioxide, (5) high boiling point, (6) low specific heat, and (7) high stability at temperatures required for the release of absorbed sulphur dioxide. An additional and highly important property of dimethyl-aniline which we have discovered is a capacity for absorption of large quantities of sulphur dioxide in a wide temperature range without the production of solid reaction products and without harmful or undesirable increase in the viscosity of the liquid. Tests conducted in a temperature range from 40° C. down to temperatures approaching 0° C. failed to produce solid reaction products or undesirable viscosity increases even when quantities of sulphur dioxide in excess of 400 grams per liter were absorbed.

It has been proposed heretofore to employ aromatic amines for sulphur dioxide absorption, but the processes proposed usually have required the use of diluents or solvents for the amines in conjunction with the amines to prevent thickening of the absorption media by dilution or by solution of the solid reaction products which form when the amines are used alone and also to aid in the reaction between the sulphur dioxide and the amine.

The use of a diluent or solvent for the amine increases the quantity of liquid to be handled with a consequent increase in equipment, labor and other costs, and it may result in increased oxidation of sulphur dioxide. The time required for absorption also is increased because of the lower efficiency of contact between the sulphur dioxide and the amine resulting from dilution. The use of diluents has the additional disadvantage that they may be lost by vaporization with a consequent increase in the cost of the operation. Such undesirable diluents include paraffin oil, diphenyl and diphenyl oxide.

In carrying out the process of our invention, we prefer to employ dimethyl-aniline free or substantially free of all diluent substances whether solvents or non-solvents for sulphur dioxide or the dimethyl-aniline, and we prefer to carry out the absorption treatment in the temperature range of 10° C. to 40° C. and at the prevailing atmospheric pressure. Temperatures within this range are readily obtainable and easily maintained in operations involving sulphur dioxide absorption. Absorbed sulphur dioxide may be released in any suitable manner. Oxidation products may be removed from the absorption medium either continuously or intermittently. For removing such oxidation products, we prefer to wash the absorption medium with a substance capable of dissolving them and substantially immiscible with the dimethyl-aniline. In order to release or liberate the absorbed sulphur dioxide, we prefer to heat the sulphur dioxide solution to its boiling point at the prevailing atmospheric pressure. While we prefer to operate our process at atmospheric pressure and at the temperatures indicated, it will be understood that the invention contemplates, also, absorption and liberation of sulphur dioxide at pressures both above and below atmospheric pressure and at temperatures most suitable in view of the pressure conditions employed.

In a preferred complete process of our invention, suitably cooled and cleaned gases containing the sulphur dioxide to be absorbed are brought into contact with the dimethyl-aniline in an absorption apparatus which permits countercurrent flow of the two fluids, apparatus such, for example, as a bubble plate tower. In using dimethyl-aniline, we find it to be highly advantageous to employ a bubble plate tower or equivalent apparatus which provides a series of pools of dimethyl-aniline through which the gases containing sulphur dioxide may be bubbled successively. We preferably employ any bubble plate tower or equivalent apparatus provided with suitable vertically spaced bubble shelves or plates, suitable bubble caps and suitable conduits which provide for the formation of pools of dimethyl-aniline while permitting the dimethyl-aniline to flow downwardly through the apparatus and which cause ascending gases to bubble through the pools. The use of apparatus such as a bubble plate tower permits accurate control of the relative rates of flow of the gases and the dimethyl-aniline and provides for the sufficiently prolonged and intimate contact of gases and dimethyl-aniline which is essential to the degree of completeness of absorption and rate of absorption of the sulphur dioxide required to reduce the sulphur dioxide content of the gases to the desired extent and to produce a pregnant solution containing the desired quantity of sulphur dioxide.

We have discovered, also, that it is not essential to efficient operation of a process involving the use of dimethyl-aniline to thoroughly dry the gases treated by absorption. Small amounts of water at temperatures above about 13° C. do not interfere. At lower temperatures, crystals may be obtained. We have found that amounts of water up to about five (5%) percent of the weight of the absorption liquid do not interfere seriously with the efficiency of the process of our invention involving the use of dimethyl-aniline.

In using a bubble plate tower for absorption in a preferred complete process of the invention, the waste gases are discharged from the upper portion or top of the tower and the pregnant solution (dimethyl-aniline containing absorbed sulphur dioxide) is discharged or withdrawn from the lower portion or bottom of the tower. The waste gases are passed to a scrubber where any dimethyl-aniline entrained as vapor or mist is removed by a suitable reagent such as sulphuric acid.

The pregnant solution containing the absorbed sulphur dioxide preferably is passed through a heat exchanger, where it is heated by the stripped liquid, to the top of a stripping tower, which may be of either the packed type or bubble plate type. During the passage of the liquid through this tower the absorbed sulphur dioxide is boiled out by the application of heat at the base of the tower and may flow first, to a condenser where the greater part of the entrained absorbent vapor may be removed, and then to a tower where it may be brought in contact with a reagent such as sulphuric acid to remove the last of the absorbent. This tower may also be used for drying the sulphur dioxide or a separate dryer may be employed. In either case, substantially pure, dry sulphur dioxide may be produced.

The stripped liquid from the base of the stripping tower may be passed through the heat exchanger, heretofore mentioned, to a tank feeding the absorption tower and be ready for re-use for the absorption of sulphur dioxide.

While it is possible to carry out the stripping operation directly on the solution of sulphur dioxide in the organic liquid, we have found it advantageous to use steam, either introduced directly into the liquid, or generated in the stripping tower by maintaining a body of water or a body of a dilute aqueous solution of an agent such as an alkali or ammonium sulphite in the base of the tower and applying heat indirectly. The latter is preferable as the alkali or ammonium sulphite reacts with any oxidation product of the sulphur dioxide to form water soluble salts which dissolve in the water and may be removed by periodic bleeding. Water alone is a solvent for the oxidation product and it may be used without the addition of any other chemical agent. Sulphate removal by means of an agent such as sodium sulphite may be accomplished by treating either the pregnant solution or the stripped solution.

Most of the water or aqueous solution carried out by the organic liquid may be separated in a settling tank just after the liquid leaves the tower. The remainder may be separated after cooling in the heat exchanger, either in a settling tank as before or in a separating centrifuge.

A preferred complete process of the invention is illustrated in the schematic flow sheet which forms the single figure of the accompanying drawing.

In the process illustrated in the drawing, dimethyl-aniline substantially free of any diluent or solvent substance is introduced into the upper portion of the absorber 1 from a storage or supply tank 2, and gases containing the sulphur dioxide to be absorbed are introduced into the lower portion of the absorber 1, for example, through a conduit leading from the meter 3. The absorber 1 is a tower of the bubble plate type, as shown, and, as indicated by the numeral 4, some or all of the plates are double-walled and means are provided for introducing a cooling fluid into and withdrawing the cooling fluid from the space between the walls.

Dimethyl-aniline introduced into the upper portion of the absorber passes downwardly (forming pools on the various plates) in countercurrent flow with the gases introduced into the lower portion of the absorber and flowing upwardly therethrough. As the dimethyl-aniline passes downwardly through the absorber, it absorbs sulphur dioxide from the gases flowing upwardly. A pregnant solution containing the desired amount of absorbed sulphur dioxide is obtained in the lower portion of the absorber and a gaseous product substantially free of sulphur dioxide is obtained in the upper portion of the absorber. The amount of sulphur dioxide contained in the pregnant solution and the amount of sulphur dioxide remaining in the gases reaching the upper portion of the absorber will depend upon the conditions selected for operation in accordance with the invention.

The gases pass from the upper portion of the absorber 1 through a passage of large cross-section to a scrubber 5 and from the scrubber to waste. The scrubber 5 is of such construction that the gases pass in contact with sulphuric acid, entering the upper portion of the scrubber from the tank 6, to effect the removal of dimethyl-aniline entrained in the gases as vapor or mist. The sulphuric acid from the bottom of the scrubber 5 is conducted to a dimethyl-aniline regenerator 7.

Pregnant solution from the bottom of the absorber is conducted to a storage tank 8. From the storage tank 8, the pregnant solution is conducted to a pump 9 which forces it, through suitable conduits and through a heat exchanger 10, to the top or upper portion of a stripping tower 11. In the heat exchanger 10, the pregnant solution passes in heat exchange relationship with, but out of direct contact with, regenerated dimethyl-aniline from the stripping tower 11.

The stripping tower 11 is a bubble plate tower of the type of, but larger than, that used for absorption, as shown, and pregnant solution introduced into its upper portion flows downwardly therethrough in contact with and in countercurrent relationship with upwardly flowing water vapor. In passing downwardly through the stripping tower, the pregnant solution becomes heated to its boiling point, and sulphur dioxide absorbed therein is liberated with regeneration of the dimethyl-aniline. The regenerated dimethyl-aniline, substantially free of sulphur dioxide, is collected in the lower portion of the stripping tower together with water resulting from condensation of the steam employed and water or sulphite solution maintained in the base. The stripping operation may be controlled readily to effect liberation of the sulphur dioxide to the extent that an amount less than about 0.10 gram per liter is retained in the regenerated dimethyl-aniline.

The dimethyl-aniline is substantially immiscible with water and forms a separate upper layer which is tapped from the bottom or lower portion of the stripping tower and passed by means of a pump 12 through the heat exchanger 10 and to a separator 13 wherein it is permitted to separate from any entrained water. The separated dimethyl-aniline is conducted to the storage tank 2 which feeds the absorber. Water from the separator 13 is returned to the base of the stripping tower.

Liberated sulphur dioxide passes from the upper portion of the stripping tower to a rectifier 14, where entrained water and absorbent are removed, thence to a cooler 15 and to a drying tower 16. The rectifier and cooler are so arranged above the stripping tower that water removed from the gases passes into the stripping tower and downwardly therethrough to its base. In the drying tower 16, the sulphur dioxide flows upwardly in contact with downwardly flowing sulphuric acid introduced from the tank 17. The dry sulphur dioxide gas is passed successively to a compressor 18, a sulphur dioxide condenser 19 and storage tanks 20.

For sulphate removal, an aqueous solution of sodium sulphite is introduced from the tank 22 into the water layer at the base of the stripping tower, and a portion of this is bled continuously to a heater 21 wherein it is heated to produce the steam required for the stripping operation. The heater 20 is heated by means of steam tubes therein to a temperature and under conditions such as to produce steam for introduction into the base of the stripping tower to effect the liberation of the sulphur dioxide with the production of a relatively concentrated solution of sodium sulphate, the steam passing from the heater to the stripping tower through the separator 23. The concentrated solution of sodium sulphate formed in the heater 21 and which also contains sodium sulphite and dimethyl-aniline is conducted to the dimethyl-aniline regenerator 7. Sodium carbonate is introduced into the regenerator 7 to aid in the liberation of the dimethyl-aniline. Dimethyl-aniline liberated or regenerated in the regenerator is returned to the system and sodium sulphate produced is passed to waste.

It is possible to control the absorption operation to produce liquid solutions of sulphur dioxide in dimethyl-aniline containing any desired amounts of sulphur dioxide up to about four hundred (400) grams per liter or more, depending upon temperatures and the sulphur dioxide content of the gas treated. In some operations, it is feasible to merely bubble the gases to be treated through one or more stationary pools of dimethyl-aniline until the dimethyl-aniline becomes saturated with sulphur dioxide and then heat the saturated solution to release the sulphur dioxide and regenerate the dimethyl-aniline. We have demonstrated that gases containing about 0.25 to 18.0 percent sulphur dioxide may be contacted with dimethyl-aniline at temperatures of 10° C. to 30° C. to produce liquid solutions of sulphur dioxide in dimethyl-aniline containing from about 50 to 400 grams per liter, the solutions containing the greater amounts of sulphur dioxide being obtained at the lower temperatures and in the treatment of the gases richer in sulphur dioxide.

In carrying out our preferred process in which the gases and dimethyl-aniline are passed in contact in countercurrent relationship, we prefer to so control the process as to produce solutions of sulphur dioxide in dimethyl-aniline containing sulphur dioxide in amounts over 50 grams per liter. The production of solutions containing 50 grams per liter or less results in inefficiency and requires the maintenance of a large circulating volume of dimethyl-aniline which is an expensive reagent. The stripping or liberating operation is less efficient when solutions of low concentration of sulphur dioxide are produced, the sulphur dioxide being held more tenaciously as complete exhaustion is approached. With solutions of higher concentrations, relatively smaller amounts of heat are required for stripping, as solutions of higher concentrations have lower boiling points. Under varying or different circumstances, we find it advantageous to so control the process as to produce solutions containing sulphur dioxide in the ranges 50 to 100 grams per liter; 100 to 150 grams per liter; 150 to 200 grams per liter; 200 to 250 grams per liter; 250 to 300 grams per liter; 300 to 350 grams per liter; 350 to 400 grams per liter. Such control can be accomplished readily when suitable gases are available by controlling such factors as temperatures and relative rates of flow of gases and absorbent. Under conditions prevailing in most localities where sulphur dioxide recovery processes may be employed, a feasible commercial process involving the use of dimethyl-aniline requires that absorption and stripping be so controlled as to accomplish absorption of not less than about 150 grams per liter and substantially complete liberation of the absorbed sulphur dioxide in each cycle.

We aim to accomplish, preferably, a recovery of not less than about 80 percent of the sulphur dioxide contained in the gases treated, and this can be done readily through control of temperatures and times of contact of gases and absorbent. The sulphur dioxide content of the tail gases, that is, the gases discharged from the process after absorption of the sulphur dioxide, will depend on the specific problem. When the gases are being treated to prevent pollution of the air primarily, the sulphur dioxide content must be reduced to a very low value. When the purposes of the operations are chiefly commercial, we prefer, in treating gases containing about 3 percent or more of sulphur dioxide, to aim at the production of tail gases containing about 0.10 to 0.50 percent of sulphur dioxide.

In our preferred type of operation, we maintain in the system, dimethyl-aniline in total amount equal only to twenty-five to fifty percent of the volume passed through the absorption apparatus in twenty-four hours, the entire volume being used for absorption from two to four times during each twenty-four hour period. This obviously permits great economy and it is made possible by the high absorptive capacity of the dimethyl-aniline and the great ease with which even the more concentrated solutions may be handled and stripped. Such a small volume of absorbent of such high capacity permits the use of relatively small apparatus and in this manner contributes greatly to the economy of the process.

The following data were obtained in tests carried out over a period of several months using dimethyl-aniline and laboratory apparatus of the type of a bubble plate tower. The apparatus was of such nature as to effect intimate and actual contact of the gases containing sulphur dioxide and the dimethyl-aniline for a period of about four-tenths (0.4) of a second, the actual time of passage of the gases through the absorber being about 6 seconds:

| Gas treated percent SO$_2$ | Gas discharged percent of SO$_2$ | Volumetric ratio SO$_2$:DMA | Absorber temperatures, °C. | | Temp. of liberation of SO$_2$ °C. | SO$_2$ absorbed and recovered grams per liter of DMA in each cycle |
|---|---|---|---|---|---|---|
| | | | Solution in | Solution out | | |
| 3.01 | 0.43 | 62.7:1 | 19.4 | 27.4 | 106.4 | 144.5 |
| 3.09 | .52 | 84.0:1 | 12.4 | 26.0 | 106.9 | 180.0 |
| 5.90 | .23 | 46.0:1 | 28.3 | 33.3 | 101.9 | 110.0 |
| 5.95 | .51 | 98.0:1 | 21.1 | 30.2 | 104.5 | 231.0 |
| 5.98 | .52 | 97.0:1 | 16.1 | 27.1 | 104.3 | 237.0 |
| 5.99 | .54 | 80.0:1 | 24.2 | 26.9 | 101.6 | 186.0 |
| 6.01 | .55 | 99.0:1 | 21.3 | 30.5 | 105.2 | 233.5 |
| 6.03 | .52 | 70.0:1 | 29.1 | 31.8 | 101.2 | 167.5 |
| 6.04 | .29 | 54.0:1 | 26.6 | 31.4 | 103.2 | 128.5 |
| 6.04 | .50 | 102.0:1 | 14.9 | 25.6 | 104.3 | 246.5 |
| 6.06 | .43 | 95.0:1 | 18.7 | 26.2 | 107.3 | 241.0 |
| 6.07 | .47 | 103.0:1 | 17.0 | 24.9 | 104.2 | 255.5 |
| 6.08 | .57 | 71.0:1 | 26.8 | 30.1 | 100.7 | 168.0 |
| 6.09 | .69 | 66.0:1 | 32.4 | 34.5 | 101.0 | 149.0 |
| 6.12 | .12 | 43.0:1 | 28.7 | 34.2 | 102.4 | 108.0 |
| 6.13 | .54 | 65.0:1 | 34.0 | 36.0 | 101.0 | 144.0 |
| 8.89 | .88 | 80.0:1 | 25.5 | 32.2 | 106.6 | 191.5 |
| 9.15 | .68 | 82.0:1 | 28.7 | 32.3 | 107.9 | 202.5 |
| 12.06 | .59 | 84.0:1 | 28.4 | 34.6 | 108.4 | 207.0 |
| 12.04 | .62 | 78.0:1 | 28.7 | 36.8 | 107.5 | 194.5 |

The following data, illustrating results capable of being obtained in carrying out a process in accordance with the invention, were obtained in the operation of a pilot plant, provided with cooling means, of the same type as but approximately thirty-three times as large as the laboratory plant employed in obtaining the results illustrated by the data given above, and represent the averages of results obtained in four periods of operation each of several days duration. The apparatus was of such nature as to effect intimate and actual contact of the gases containing sulphur dioxide and the dimethyl-aniline for a period of about two seconds, the actual time passage of the gases through the absorber being about 15 seconds:

| Gas treated percent SO$_2$ | Gas discharged percent SO$_2$ | Absorber temperatures, °C. | | Temperature of liberation of SO$_2$ °C. | SO$_2$ absorbed and recovered grams per liter of DMA in each cycle |
|---|---|---|---|---|---|
| | | Solution in | Solution out | | |
| 6.06 | 0.45 | 15.6 | 12.3 | 98.2 | 340 |
| 6.04 | .46 | 14.8 | 9.2 | 97.8 | 354 |
| 6.02 | .28 | 12.3 | 9.8 | 97.2 | 371 |
| 6.06 | .25 | 13.7 | 10.1 | 96.1 | 366 |

In the tests conducted in obtaining the results shown above, dimethyl-aniline (DMA) substantially free of any diluent matter was employed as the absorbent for the sulphur dioxide. The temperatures of liberation shown are temperatures taken at the bases of the stripping tower and represent boiling temperatures of mixtures containing largely water and dimethyl-aniline.

We claim:

1. The method of recovering sulphur dioxide from gases containing the same in amount equal to about 3 to 6 percent by volume which comprises forming a series of pools of absorption liquid by flowing diamethyl-aniline downwardly through a bubble plate tower, passing the gases upwardly through the tower and through the pools of absorption liquid formed therein at substantially atmospheric pressure to effect absorption of sulphur dioxide contained in the gases, cooling one or more of the pools to maintain the dimethyl-aniline therein at a temperature within the range 10° C. to 20° C. thereby to facilitate absorption of the sulphur dioxide, discharging from the last pool of the series a tail gas containing less than about 0.5 percent sulphur dioxide by volume, withdrawing from the lower portion of the tower a solution consisting essentially of sulphur dioxide and dimethyl-aniline and containing not less than about 150 grams of sulphur dioxide per liter, heating the solution to liberate sulphur dioxide, and collecting the liberated sulphur dioxide.

2. The method of recovering sulphur dioxide from gases containing the same in amount equal to about 3 to 6 percent by volume which comprises forming a series of pools of absorption liquid by flowing dimethyl-aniline downwardly through a bubble plate tower, passing the gases upwardly through the tower and through the pools of absorption liquid formed therein at substantially atmospheric pressure to effect absorption of sulphur dioxide contained in the gases, cooling one or more of the pools to maintain the dimethyl-aniline therein at a temperature within the range 10° C. to 15° C. thereby to facilitate absorption of the sulphur dioxide, discharging from the last pool of the series a tail gas containing less than about 0.5 percent sulphur dioxide by volume, withdrawing from the lower portion of the tower a solution consisting essentially of sulphur dioxide and dimethyl-aniline and containing not less than about 150 grams of sulphur dioxide per liter, heating the solution to liberate sulphur dioxide, and collecting the liberated sulphur dioxide.

3. The method of recovering sulphur dioxide from gases containing the same in amount equal to approximately 3 to 12 percent by volume which comprises forming a series of pools of absorption liquid by flowing diamethyl-aniline downwardly through a bubble plate tower, passing the gases upwardly through the tower and through the pools of absorption liquid formed therein at substantially atmospheric pressure to effect absorption of sulphur dioxide contained in the gases, cooling one or more of the pools to maintain the dimethyl-aniline therein at a temperature below approximately 20° C. thereby to facilitate absorption of the sulphur dioxide, discharging from the last pool of the series a tail gas containing less than approximately 0.5 percent sulphur dioxide by volume, withdrawing from the lower portion of the tower a solution consisting essentially of sulphur dioxide and dimethyl-aniline and containing not less than approximately 150 grams of sulphur dioxide per liter, heating the solution to liberate sulphur dioxide, and collecting the liberated sulphur dioxide.

4. The method of recovering sulphur dioxide from gases containing the same in amount equal to not less than approximately 3 percent by volume which comprises forming a series of pools of absorption liquid by flowing dimethyl-aniline downwardly through a bubble plate tower, passing the gases upwardly through the tower and through the pools of absorption liquid formed therein at substantially atmospheric pressure to effect absorption of sulphur dioxide contained in the gases, cooling one or more of the pools to maintain the dimethyl-aniline therein at a temperature below approximately 20° C. thereby to facilitate absorption of the sulphur dioxide, discharging from the last pool of the series a tail gas containing less than approximately 0.5 percent sulphur dioxide by volume, withdrawing from the lower portion of the tower a solution consisting essentially of sulphur dioxide and dimethyl-aniline and containing not less than approximately 250 grams of sulphur dioxide per liter, heating the solution to liberate sulphur dioxide, and collecting the liberated sulphur dioxide.

GEORGE H. GLEASON.
ALFRED C. LOONAM.